W. L. MORRIS.
CENTRIFUGAL EXTRACTOR.
APPLICATION FILED DEC. 21, 1917.

1,435,545.

Patented Nov. 14, 1922.

Inventor—
William L. Morris

W. L. MORRIS.
CENTRIFUGAL EXTRACTOR.
APPLICATION FILED DEC. 21, 1917.
1,435,545.
Patented Nov. 14, 1922.
4 SHEETS—SHEET 2.
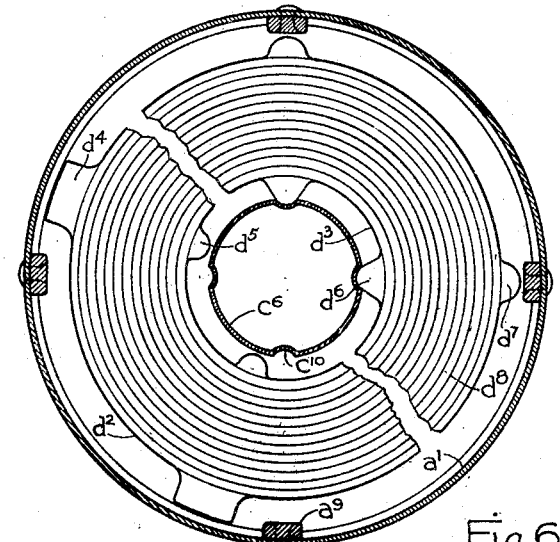
Fig. 2
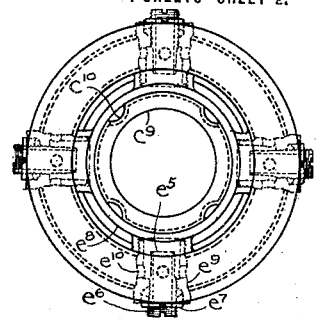
Fig. 3
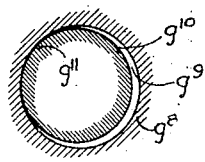
Fig. 4
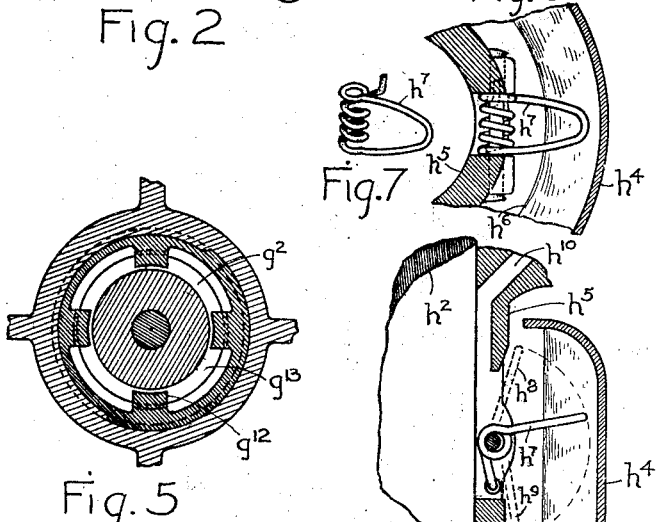
Fig. 5  Fig. 6ª  Fig. 7  Fig. 6
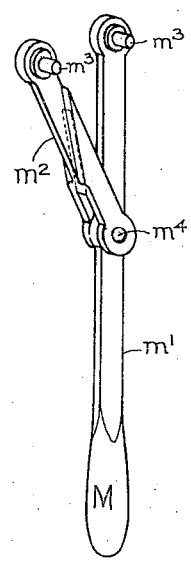
Fig. 9
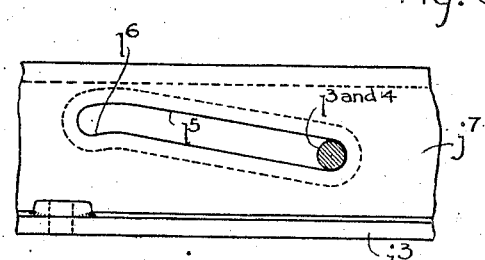
Fig. 8
Inventor—
William L. Morris Patented Nov. 14, 1922.

1,435,545

UNITED STATES PATENT OFFICE.

WILLIAM L. MORRIS, OF CHICAGO, ILLINOIS.

CENTRIFUGAL EXTRACTOR.

Application filed December 21, 1917. Serial No. 208,243.

*To all whom it may concern:*

Be it known that I, WILLIAM L. MORRIS, a citizen of the United States, residing at Chicago, in the county of Cook and State of Illinois, have invented certain new and useful Improvements in a Centrifugal Extractor, of which the following is a specification.

This invention relates primarily to the self cleaning features of a centrifugal extractor together with improvements in the bearings and other features thereof. The extractor may be used to remove precipitation from liquid by retaining the precipitation in the bowl while it is running, and it can also be used for separating two liquids of different specific gravities together with the precipitation of sediment or impurity. The cleaning of the separator is accomplished by breaking up the precipitation so it is carried in suspension by the fluid in the extractor, then discharging the entire contents from the bowl. The invention consists in the novel construction, combination and arrangement of the parts.

In the accompanying drawings;

Fig. 2 is a top view of the precipitation discs;

Fig. 3 is a top view of the separator;

Fig. 4 is an explanatory view of the lower bearing;

Fig. 5 is a sectional plan view of the lower bearing;

Fig. 6 is an enlarged section of an oil dipper of the upper bearing;

Fig. 6a is a different sectional view of the same;

Fig. 7 is a perspective of an oil dipper alone;

Fig. 8 is an elevation of the supporting base showing a cam slot for the bowl lifter;

Fig. 9 is a perspective of a case wrench;

The main parts of the extractor are generally designated thus; A— the extractor bowl;
B— the dirty liquid inlet;
C— the shaft and tube drive;
D— the precipitation discs;
E the separator;
F— the precipitation discharge and clutch;
G— the lower bearing;
H— the upper bearing and belt drive;
J— the base and support;
K— the liquid discharge catching troughs;
L— the bowl lifter and brake;
M— the case wrench;
N— the modified form of extractor with direct motor drive using screens instead of precipitation discs; and,
O— the second modified form of extractor driven from below the extractor, and using a mass to collect precipitation instead of discs.

Figure 1:
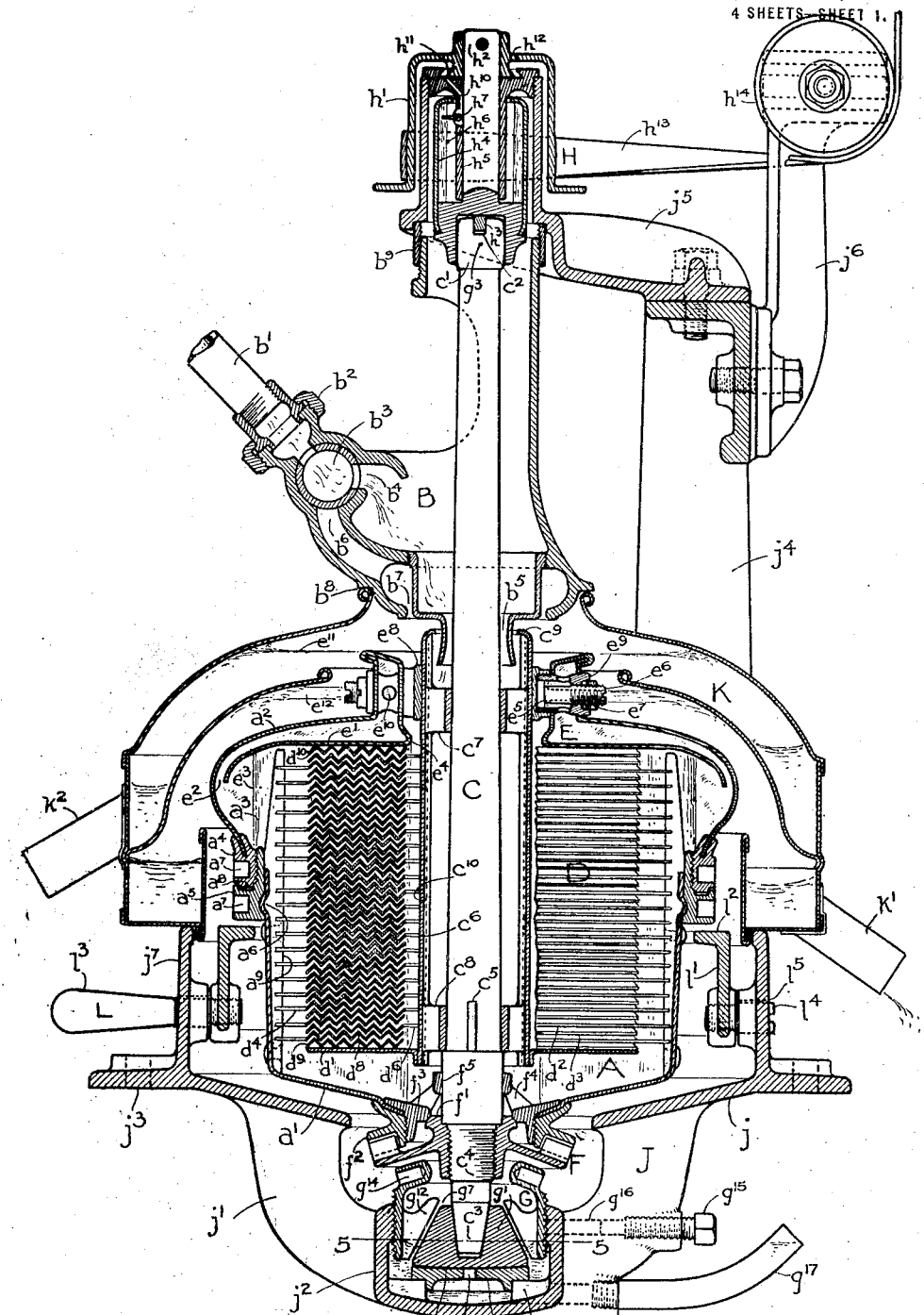
Fig. 1 is a sectional view of the preferred form of extractor, the preference being chiefly in the precipitation discs used to retain the precipitation.

As shown in Fig. 1, $a^1$ designates the lower portion or case of the extractor bowl and $a^2$ the upper part of the bowl. These two parts are joined with a threaded connection $a^3$, a ring $a^4$ being spun and brazed to the cover $a^2$ and a ring $a^5$ has the lower case $a^1$ spun into a groove $a^6$ and brazed. In these rings $a^4$ and $a^5$ are wrench holes $a^7$ which are engaged by the wrench M, shown in Fig. 9, to tighten or loosen the rings, between which is a packing ring or gasket $a^8$. Driver ribs $a^9$ are secured to the lower part of case $a^1$ and drive half of the discs D.

An inlet pipe $b^1$ to the extractor is provided with a union $b^2$ and a three way valve $b^3$ which normally discharges through a port $b^4$ and thence around shaft C and into extractor A through passage $b^5$. When the extractor is being cleaned, some of the liquid from pipe $b^1$ may be discharged through a port $b^6$ and a port $b^7$ by turning the valve $b^3$. A shoulder $b^8$ bears upon the trough K holding it in place, a colar $b^9$ at the top of the inlet member B permitting adjustment so that the spouts K will be securely held.

The drive shaft C has a head $c^1$ which has a keyway drive connection $c^2$, this head having a small amount of clearance so that the lower end can swing out of center a slight amount. The lower end $c^3$ is connected to the lower bearing G and a threaded end $c^4$ is connected to the discharge valve and clutch F. The shaft has a keyway $c^5$ to drive a supply tube $c^6$. This tube has bearings $c^7$ and $c^8$ attached to it and is rotated by the shaft C. The upper end $c^9$ of the tube is closed or turned inwardly to prevent the liquid from escaping at the upper end. Around the periphery of tube $c^6$ are grooves $c^{10}$ which drive half of the precipitation discs D.

A plain disc $d^1$ is attached to the lower end of tube $c^6$ and supports the precipitation discs $d^2$ and $d^3$. These case driven discs $d^2$ and tube driven discs $d^3$, shown in Figs. 1 and 2 are alike excepting that the drivers and agitators are reversed. The case driven discs $d^2$ have driver ends $d^4$ which engage with the driver ribs $a^9$ which are attached to case $a^1$ and the agitator ends $d^5$ just clear the exterior of driver tube $c^6$. The tube driven discs $d^3$ have driver lugs $d^6$ that engage in grooves $c^{10}$ of tube $c^6$ and have external agitator lugs $d^7$ that just clear the case driven arms $a^9$. The corrugations $d^8$ are alike in all discs and when the discs are stacked, a very narrow passage is allowed between discs, the discs being held apart by slight projections in the corrugated surface, the irregularity of the stamped surfaces ordinarily being sufficient. The lower corrugated disc $d^9$, shown in Fig. 1 is attached to the plain disc $d^1$ and the liquid passage between the two discs is shut off. The upper disc $d^{10}$ is similarly attached to a separator partition plate $e^1$. Either or both discs $d^9$ and $d^{10}$ are secured at the inner or outer edge, preferably the inner one, and the other edge is sprung away from the plain disc to which it is attached, so that when the parts are assembled the top and bottom discs $d^9$ and $d^{10}$ will serve as a spring retainer and hold discs firmly together with a tension.

The separator E has a partition disc $e^1$ which allows the heavier liquid to enter through an opening $e^2$ and from this point on the heavier liquid does not come in contact with the lighter liquid. The dividing line between the light and heavy liquid is represented by $e^3$. The discharge for the lighter liquid is over a beaded edge $e^4$ formed in the partition disc $e^1$. The overflow discharge for the heavier liquid is over the edge $e^5$ of an externally threaded tube $e^6$ having a packing nut $e^7$ for preventing leakage around the thread and also serving as a lock nut. The ring $e^8$, also shown in Fig. 3, has bosses into which are screwed overflow bodies $e^9$, these bodies having openings $e^{10}$ to allow the heavier liquid to enter and pass over the end of overflow tube at $e^5$. Screw driver slots are provided in both screw $e^6$ and nut $e^7$ to permit adjusting of the heavy liquid overflow, this adjustment determining the distance of line $e^3$ to or from the axis of shaft C. The stream of lighter liquid discharge is indicated by $e^{11}$ and the heavier liquid discharge by $e^{12}$.

At the bottom of the bowl A is the precipitation discharge and clutch F driven and guided by the shaft C. Threaded on the end $c^4$ of shaft C is a valve member $f^1$ having teeth at the outer edge which engage with corresponding teeth of a ring $f^2$ forming a clutch, and with a valve seat which is engaged by a corresponding face of another valve member $f^3$ which has arms $f^4$ connecting it to a ring $f^5$ fitting around the shaft C. The ring $f^2$ and member $f^3$ are threaded together with the lower edge of the case $a^1$ clamped between them, making a fluid tight joint between the case and the member with a gasket or solder. The weight of the case and its contents keeps the valve member $f^3$ tight on the seat of the other member $f^1$, and when the case $a^1$ is raised the ring $f^5$ guides the lower end, the raising movement also separating the clutch teeth and opening the valve formed by the members $f^1$ and $f^3$. The space between the lower clutch teeth of the member $f^1$ is made amply large to give sufficient discharge area for the liquid when the case is raised. The precipitation would be discharged into a tank upon which the extractor is commonly placed. The lower bearing G is in fact two distinct bearings, the step or end thrust bearing and the side steady or guide bearing. The shaft end $g^1$ is attached to shaft C so it will revolve therewith, and the lower face $g^2$ is spherical, the center being the same as the center of head $c^1$ at the upper end of the shaft, and there indicated $g^3$. An end thrust bearing $g^4$ is supported on lugs $g^5$ with an oil passage between the lugs and the bottom of bearing $g^4$, entering the bearing through a hole $g^6$, the rotation of shaft end $g^1$ carrying oil across the spherical face $g^2$. The side bearing face of shaft end $g^1$ is shown conical to facilitate adjusting the side bearing to and from it. The amount of clearance $g^7$ required is determined by the amount that shaft runs out of center. If the clearance is more than enough to permit the rotation of the bowl and shaft upon their axis, it will permit vibration, and if the bearing is too close to permit the bowl and shaft to rotate upon their axis, vibration will be started. The direction and frequency of vibration are distinct from the motion of rotation, and such vibration as takes place is started by the frictional resistance of contacts on one side of the axis. If, as shown in Fig. 4, the stationary outer guide bearing $g^8$ is a continuous bearing around the circumference, then the lubricant $g^9$ would rotate at an average speed of half that of the periphery $g^{10}$ of the rotating member, provided the lubricant were not forced to a higher rotative speed by the bearing side $g^{11}$ of the rotatable member. The counteraction on the rotating member causes it to sway out of its axis and then return again, thereby causing swaying or vibrating motions. To avoid this vibration, passages are provided so the oil will have a free opportunity to escape and not build up a pressure at the bearing which will throw the shaft out of its proper axis of rotation. Fig. 5 shows a plan view of bearing G on the line 5—5 of Fig. 1, the guide bearings $g^{12}$ having openings $g^{13}$ between them for oil to escape. Holes $g^{14}$ are provide in upper part of this guide bearing so it can be screwed toward or away from the shaft end $g^1$ and when positioned so vibration ceases, it is locked in the base $j$ with a screw $g^{15}$ which has a soft plug $g^{16}$. An oil supply tube $g^{17}$ is threaded into the base J and extends upwardly on the outside to such a height that the amount of oil in bearing G is limited, and by turning it downwardly, the bearing can be drained. The pin holes $g^{14}$, screw $g^{15}$ and oil tube $g^{17}$ are usually within an oil tank (not shown) upon which the extractor rests, and may be reached through the manhole cover of such tank.

An upper bearing and belt drive H is shown with a flanged pulley $h^1$ pinned to a driver $h^2$. The lower end of this driver has side guides for the upper end $c^1$ of shaft C and a driver key $h^3$ secured to the driver $h^2$. An oil case $h^4$ is secured to the driver at its lower end and made oil tight. A bushing $h^5$ is held stationary around the driver $h^2$ and the case $h^4$ rotates around the bushing, the oil surface, when in rotation, being as indicated by $h^6$. An oil dipper $h^7$ is shown enlarged in Fig. 6; this dipper being made of elastic form so it will close back as indicated by $h^8$ (Fig. 6) when passed into the oil case $h^4$ and as indicated by $h^9$ when removed, the normal position being as shown, $h^7$. An oil hole $h^{10}$ in the bushing $h^5$ returns any excess oil that passes upward, and away from the oil collar $h^{11}$; oil is admitted to the bearing through this hole $h^{10}$ and hole $h^{12}$ in the pulley $h^1$. A drive belt $h^{13}$ passes over pulley $h^1$ and over a guide pulley $h^{14}$ which would be above the belt, as shown, if driven from above, or below the belt, if driven from below.

The support J consists of a pan shaped base $j$ and an upper bearing support or stand $j^4$ in the form of an inverted U. Suspended under the base by means of arms $j^1$ is an oil case $j^2$ for the lower bearing G, the cleanings from the extractor bowl passing between the arms $j^1$ and into the tank that the base rests upon, a flange $j^3$ being provided which may be bolted to such a tank. The U shaped stand $j^4$ is bolted to the flange $j^3$ of base, and a bearing support bracket $j^5$ and a guide pulley supporting bracket $j^6$ are bolted to the top of stand $j^4$. A ring $j^7$ on top of the base $j$ supports the liquid discharge catching troughs K.

Off these troughs K, a spout $k^1$ discharges the heavier liquid and a spout $k^2$ discharges the lighter liquid. The sheet of lighter liquid leaving the extractor is indicated as $e^{11}$, the heavy liquid discharge from separator being also designated as $e^{12}$. This discharge collector K is held in place on the top ring $j^7$ of base J by the collar $b^8$ of the inlet B pressing on top of the collector K. This discharge collector is located sufficiently above the extractor bowl to permit raising the bowl when opening the bottom valve and releasing the jaw clutch, and not touch the bowl while bowl is in this high position. The bowl lifter may consist of rolls or flat surfaces brought in contact with some lower part of the bowl; the means shown in Fig. 1 is a flat surface ring $l^1$ which may have a babbitt or leather face, the flat face $l^2$ serving as a brake to retard and stop the bowl so that the precipitation will flow out of the bottom of the bowl, the bowl resting on the underside of the ring $a^5$ which is attached to the lower half of the bowl. A handle $l^3$ and supporting screws $l^4$ permit the ring $l^1$ to be rotated or moved in cam slots $l^5$ of the supporting ring $j^7$ as more clearly shown in Fig. 8. These cam slots $l^5$ have slight depressions $l^6$ at their high ends and the extractor would rotate clockwise with the cams as shown, so that friction on the face $l^2$ will not rotate the ring $l^1$ if the hand is removed from $l^3$ and allow the case to be lowered into contact with the moving lower half of clutch $f^1$.

A wrench M, shown in Fig. 9 is for tightening the upper half of case $a^2$ on its lower half $a^1$, and has the increased leverage necessary to overcome the friction of the large thread $a^3$ together with force necessary to draw up packing $a^8$. This wrench has a handle portion $m^1$ and a swinging arm $m^2$ pivoted thereto with a driver stud $m^3$ projecting from the outer end of each to engage holes $a^7$ in the case rings $a^4$ and $a^5$. Since these holes $a^7$ have varied centers when drawing up the screw joint $a^3$, it is necessary to have the arm mounted on a pivot $m^4$ to permit variation in centers of the studs $m^3$. The rings $a^4$ and $a^5$ can be constructed so that the holes stand vertically, but in this case, the tension put upon the wrench would cause the bowl to revolve upon its bearings. With the holes at right angles to the axis as shown, the strain put upon wrench M causes no movement of the bowl or case upon its bearings.

Figure 10:
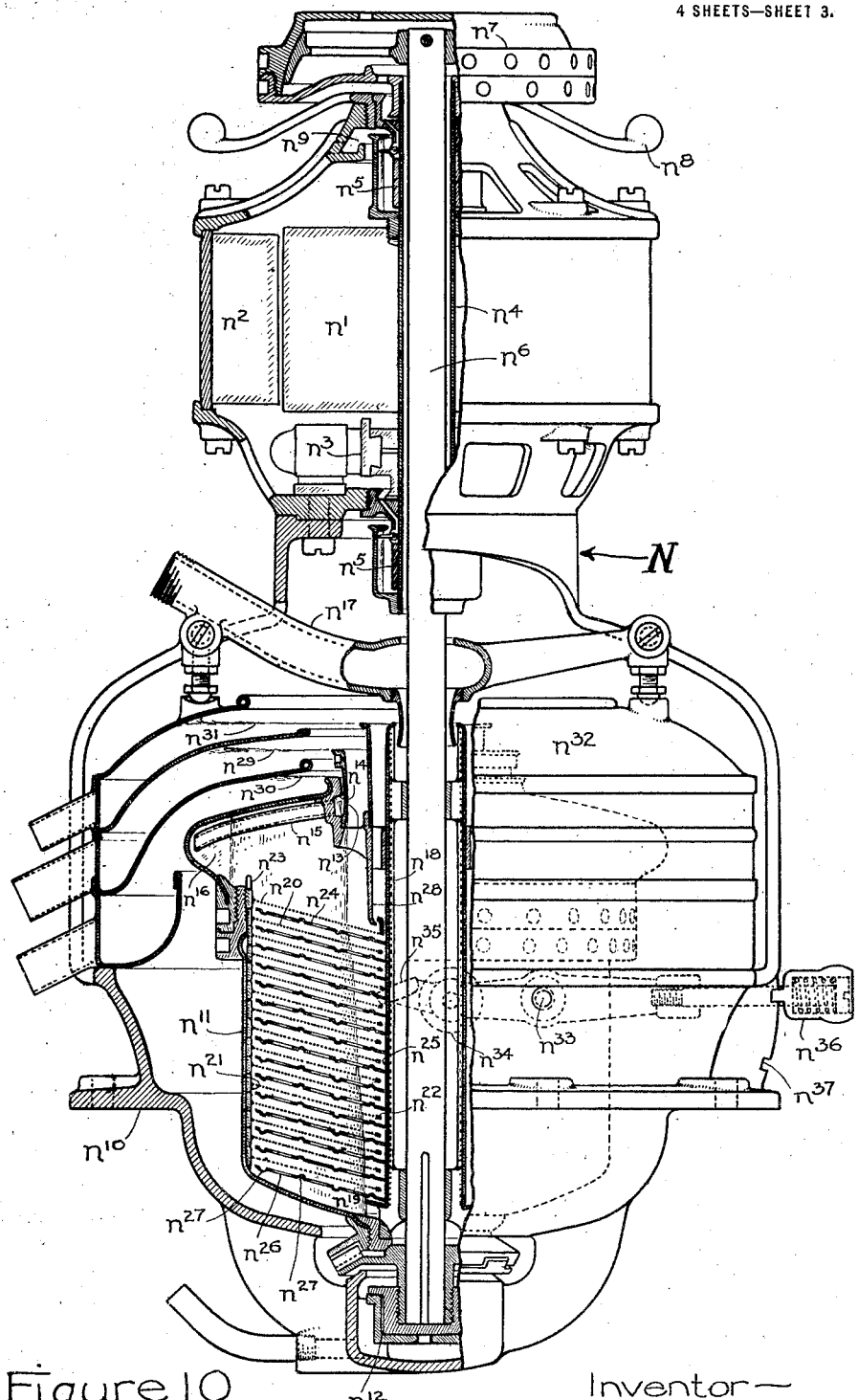
Fig. 10 is a vertical section with parts in elevation, showing a modified form of extractor, using screen discs to receive deposits and with a direct connected motor drive; and, Fig. 11 is a sectional vertical view of another modified form using a mass of renewable material to receive precipitation deposits, and having an underside drive.

Fig. 10 shows a modified form N of the extractor, with a direct connected motor drive and screen discs instead of precipitation disks as shown in Fig. 1. The motor armature is indicated $n^1$, the fields $n^2$, and the commutator $n^3$. The motor shaft $n^4$ is tubular, and the upper and lower self oiled bearings $n^5$ are similar to the upper bearing of Fig. 1. Within the hollow motor shaft $n^4$ is a driving shaft $n^6$, with a clutch $n^7$ at the upper end having a spherical contact face to allow a side movement at the lower end of the shaft $n^6$, the clutch case being closed oil tight so that separate clutch lubrication can be provided. The clutch disc is attached to the driving shaft $n^7$ and when in normal operation the weight of armature and clutch case rests upon the clutch disc. Before starting the motor, the clutch release lever $n^8$ is rotated so that the upper bearing is raised until it lifts weight of the armature and the clutch case from the clutch disc, and the motor is first started, then when under speed, the weight of the armature and clutch case is gradually lowered onto clutch disc to start the extractor. A chamber $n^9$ is provided at the top bearing to catch any oil thrown out of the upper oil well, which is directed between ribs of the outside of the motor case, away from the electrical windings. A support $n^{10}$ rests upon the tank (not shown) that receives the cleanings from the extractor, and supports the lower bearing, the motor, the extractor, the oil supply inlet, and the discharge collectors. The extractor bowl $n^{11}$ is quite similar in construction to that shown in Fig. 1, the lower bearing being shown with clearance $n^{12}$ so that the shaft may revolve on an axis out of center with the shaft, but no adjustment is shown. The separator is also shown without adjustment, the overflows for light liquid $n^{13}$ and for heavy liquid $n^{14}$ being fixed, the tubes $n^{15}$ conveying the heavy liquid $n^{16}$ to its overflow. The inlet to the extractor is through the fitting $n^{17}$ which delivers liquid around the shaft and into the central tube $n^{18}$ and then flows down through the tube to beneath the discs to the space indicated $n^{19}$. There are two sets of discs, the screen discs $n^{20}$, having a ring $n^{21}$ attached to the outer periphery of each disc and an edge protecting eyelet $n^{22}$ around the edge of the inner opening. The lower ring $n^{21}$ bears against the bottom of case and the upper ring is threaded into the ring at the top of bowl $n^{11}$, with driver lugs $n^{23}$ at the top for turning it and all discs are held firmly in place in the bowl, the leakage between the rings $n^{21}$ being kept at least as fine as the screen openings. Between the screens $n^{20}$ there are agitating discs $n^{24}$ which fit around the tube $n^{18}$ and these discs have driver lugs the same as $d^6$ of Fig. 2 and these lugs engage with slots $n^{25}$ which are the same as $c^{10}$ of Fig. 2. The discs $n^{24}$ have openings to let fluid pass through them, indicated $n^{26}$, and have rounded projections $n^{27}$ that prevent the edges from coming in contact with the screen discs $n^{20}$. When the case $n^{11}$ is raised and the speed of the case retarded, the discs $n^{24}$ rotate rapidly between the screens $n^{20}$ and release the deposits from the screen surfaces. The bulk of the deposits left on the screen wire after precipitation, is much finer than the screen openings; the screen wire, which is roughened by pickling, is a contact surface to which outwardly travelling impurities can adhere. The overflow edge of the screens is the eyelet edge $n^{22}$, and the discharge from the bowl is over $n^{13}$. The head from $n^{22}$ to $n^{13}$ gives ample head pressure on the screens, and when the lower screen is fouled so liquid overflows, it will pass through all the remainder, gradually filling up each screen and overflowing until top one overflows into the screen overflow discharge tube $n^{28}$ which has a visual sight or a signal on the outside to indicate that all screens are fouled. The film $n^{29}$ is the discharge sheet of oil from light liquid discharge; $n^{30}$ is the heavy liquid discharge and $n^{31}$ is the screen overflow discharge; the discharge collector $n^{32}$ has separate compartments and spouts for these different discharges. The case or bowl lifter for this form is shown in form of a Y shaped lever, hinged to base $n^{10}$ on screws $n^{33}$ with rollers $n^{34}$ on each side of the case which are in contact with the underside of the lower case ring until the jaw case clutch is open, then the brake ends $n^{35}$ of the lever come into contact and stop the case. A slip handle $n^{36}$ for the lever, is held in notches $n^{37}$ by a spring inside of the handle which holds case lifter in place, either open or closed position.

Figure 11:
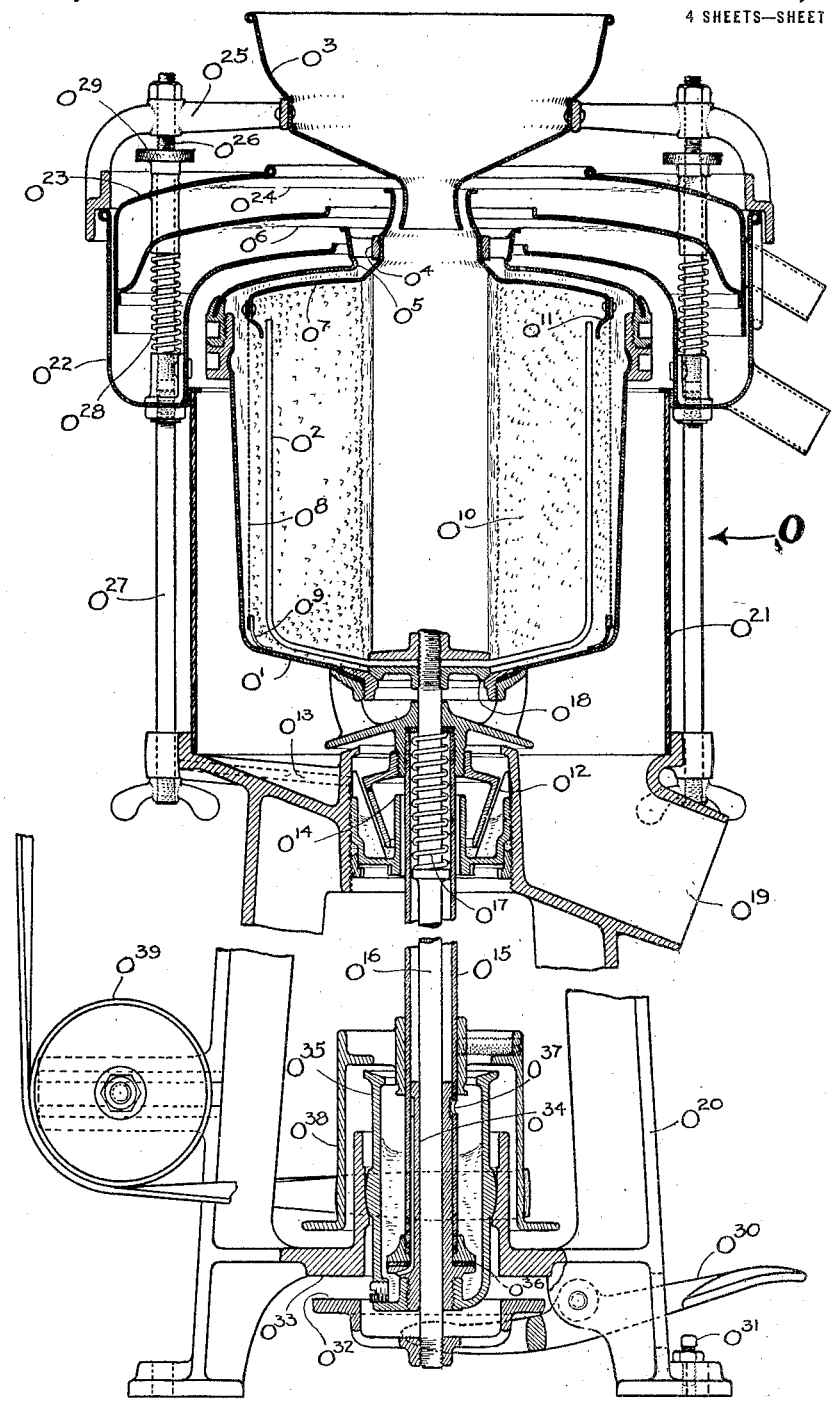

In Fig. 11 a second modified form O of extractor is shown, with a drive from below, which uses a mass to collect the precipitation. This mass can be of various materials, but saw dust is the most convenient commercial product to use. In considering the use of saw dust or any similar material in this extractor, it is necessary to consider the fluid passages between the particles of this material as being much larger than the impurity to be removed. The liquid would move between the particles of saw dust much the same as it moves between the discs as shown in Fig. 1 and the impurity would be thrown against the side of passages much the same as through the screens of Fig. 2. The head or pressure loss of the liquid in passing through this extractor will not be appreciable until the deposits have quite fully filled the passages and when these passages have been closed it becomes a filter, filtering through the deposits and at the same time carrying the impurity along with the liquid. As a filter there would be no precipitation, in fact, filtration will break up and carry along the precipitation. The mass would not be intended as a filter, for then the extractor would only serve to put pressure upon the filter bed, and this can be more readily accomplished in a stationary device. The mass is but a multitude of ledges to receive the precipitation, and the agitators break up the precipitation and dilute it with the remaining fluid in the extractor, and in this case discharges the precipitation ledges as well as the precipitation and the remaining liquid, for the precipitation will embed itself in the ledges. The extractor bowl $o^1$ is quite similar to that shown in the other forms, but is shown without a separator. If a separator were used it would be similar to that shown in the other two forms. Instead of the agitators being shown driven from the shaft and the case driven with a jaw clutch, this form shows the case $o^1$ as driven from the shaft, and the agitators $o^2$ driven by frictional contact. An inlet funnel $o^3$ is shown large and with a large bottom outlet so sawdust or like material can be fed into the bowl. The ring $o^4$ has arms by which it is attached to the top of the case $o^1$, the liquid discharge being over the inner edge $o^5$, into sheet $o^6$. The inner head $o^7$ together with screen $o^8$ to support the saw dust, and the felt or other joint closing ring $o^9$ at bottom make an inclosure to confine the sawdust $o^{10}$. The rim $o^{11}$ of the head $o^7$ prevents the agitators from flying outward and coming in contact with screen $o^8$. A steady bearing $o^{12}$ is quite similar to that shown and described in Fig. 1, being supplied through an oil hole $o^{13}$ and the maximum amount fixed by an overflow $o^{14}$. The drive shaft $o^{15}$ is tubular in form with a valve lifter rod $o^{16}$ movable inside of it. A spring $o^{17}$ holds a valve $o^{18}$ to its face at the bottom of the case $o^1$, the valve and agitator $o^2$ being attached to lifter rod $o^{16}$. A precipitation discharge spout $o^{19}$ and the inclined bottom leading to it are shown as part of the stand or base $o^{20}$. Resting within this base is a stationary shell $o^{21}$ which supports the liquid discharge collectors, which in this figure are shown in two parts, a lower part $o^{22}$ which receives the clarified liquid, and a vertically movable collector $o^{23}$ which receives discharge stream $o^{24}$ when the maximum allowed head has been reached. This dirty liquid collector can be lowered to receive stream $o^6$ until the discharge clears up sufficiently, and keep from discharging dirty liquid into that which has been clarified. A spider $o^{25}$ is drawn down on lower discharge collector $o^{22}$ with rods $o^{26}$, and the collector $o^{22}$ is drawn onto case $o^{21}$ and both drawn to base $o^{20}$ with rods $o^{27}$. A spring $o^{28}$ carries weight of collector $o^{23}$ and keeps it up to knurled nuts $o^{29}$. A Y shaped valve lifter lever $o^{30}$ at the bottom of the stand is foot operated and its travel is limited by screw $o^{31}$. A brake disc $o^{32}$ is forced up to its cooperating contact face $o^{33}$, thereby retarding its rotary motion and breaking up the contents of the bowl $o^1$. A bushing or bearing $o^{34}$ is secured to an oscillating oil case $o^{35}$ with oil holes and grooves to carry oil along the interior bearing surface of the shaft. The disc $o^{36}$ is the end thrust bearing washer. The oil hole $o^{37}$ is to prevent oil rising too high in the tube, being discharged back into the case. A driving pulley $o^{38}$ is secured to the hollow shaft $o^{15}$ and guide pulleys $o^{39}$ guide belt onto the pulley $o^{38}$.

In the operation of a centrifugal extractor, the precipitation will lodge and pack very solidly at points away from the center of rotation and will not flow away from these surfaces if the extractor be emptied. To remove these settlings, it is necessary to break up the settled mass so it can be carried in suspension by the remaining liquid. To secure the maximum amount of precipitation, it is necessary that there be no movement of one part past another wherever precipitation may be deposited. The action within the bowl is precisely the same as though the liquid were placed in a bottle and set aside to settle by gravity, the centrifugal action only intensifies gravity and reduces the time factor. Any other motion than that of absolutely true rotation effects the precipitation much the same as it would in the standing bottle. For this reason it is very necessary that the agitators travel in unison with the other parts of separator so that precipitation will not be interfered with. The purpose of the projections at edge of the discs shown in Fig. 2 is to fully break up the precipitation lying against the case, which they are able to do, but if it were desired, a scraper such as shown in Fig. 11 could be used, one that would follow the contour of the shell. As applied to Fig. 1, this scraper would be driven from the shaft and take the place of the drive arms $a^9$ and the central tube $c^6$ would be driven by the shell. The precipitation in the heavier liquid is constantly carried off with the discharge of the heavy liquid through the separator. If the liquid to be clarified became rancid in the bowl, it would be necessary to arrange all liquid contact faces in pairs the same as the discs D in Fig. 1, and arranged so one set can be retarded or stopped and the faces sufficiently close to each other to clean each other's faces. The structure of Fig. 1 is for non rancid materials and a slight trace of impurity may be left in bowl after cleaning. When about to clean the separator, the bowl or case is raised and after allowing driver to run faster than case a few seconds, the driving power is shut off and when both the driving and driven members come to a rest, the contents of case will have run out, then the case can be lowered and reengaged with clutch, and extractor can be again started. The residue liquid and broken up precipitation would be discharged by gravity to its residue tank or receptacle. In Fig. 1, the driving member consists of the shaft, the valve and lower half of jaw clutch, and the inner tube and half the precipitation discs. When the case is raised, the space between the precipitation discs is slightly increased. The separator ring $e^8$ rotates around tube $c^6$ when case is raised; the bearings $c^7$ and $c^8$ are attached to tube $c^6$ but rotate with shaft, driven by key $c^5$. The stand J is set back out of center so that the different parts can be raised and the extractor taken apart, the removal of the bearing support $j^5$ being necessary. By stopping the case and allowing driver to keep in motion, there is no centrifugal force on liquid in the case which would otherwise prevent its discharge.

In the three different forms, Figs. 1, 10 and 11, the valve is shown at bottom of the extractor bowl so that the contents will not run out when the extractor is stopped; this valve may be omitted if cleaning is frequently required and the extractor would ordinarily be fouled when it is stopped. The retarded member or bowl is held by strong frictional resistance and the power drive is maintained on the other member, which is necessary where the deposits become solidly packed and offer much resistance to the passage of the liquid; but where this resistance is slight, there can be a power driven member, leaving the other member free from a frictional or clutch connection and driven only by the liquid in the bowl, which when rotating, will give the bowl sufficient inertia so it will continue in motion when the power driven member is stopped, thus causing a relative movement of the parts to dislodge the precipitation as set forth. In cleaning the extractor shown by Fig. 1 while shaft C and half of the discs D are in motion and the bowl A and the other half of discs D are stopped, some liquid is discharged through the port $b^7$ by turning valve $b^3$; after entering the extractor discharge, the cleaning liquid passes into the bowl and across the discs D to facilitate washing the precipitation from the discs and also from the interior of bowl A.

I claim:

1. The combination with a centrifugal extractor, of agitators normally movable with the extractor and means for retarding them to break up precipitation, and a central discharge outlet for the precipitation at the bottom of the extractor.

2. The combination with a centrifugal extractor, of a separating bowl having a central bottom outlet, a valve for closing said outlet, a sediment agitator normally movable with said bowl, and common means for opening said valve and causing relative movement of the agitator over the precipitation in the bowl.

3. The combination with a centrifugal extractor, of a separating bowl having a bottom outlet, a valve for closing said outlet, a sediment agitator in said bowl normally moving with the bowl, and means for opening the valve and retarding the movement of the bowl or agitator thereby causing a relative movement of the agitator over precipitation in the bowl.

4. The combination with a centrifugal extractor, of a separating bowl having a bottom outlet, a valve for closing said outlet, a sediment agitator in and normally movable with said bowl attached to the valve, and means for opening the valve and at the same time causing a relative rotary movement of the agitator and bowl.

5. In a centrifugal extractor, the combination with means having a precipitation accumulating surface, of an agitator normally movable with said means, but variable in speed for breaking up the precipitation, means for causing a relative rotary movement of the agitators and said means, and a central bottom opening for ejecting the precipitation after it is broken up.

6. In a centrifugal extractor, the combination with means for accumulating precipitation, and other means for breaking up this precipitation, these two means normally travelling in unison; of means for causing a relative movement of the said two means by altering the speed of one of them for causing a disengagement of the precipitation from the first named means.

7. In a centrifugal extractor, the combination with means for accumulating precipitation, and other means for breaking up this precipitation, these two means normally travelling in unison; of means for causing a relative movement of the said two means for causing a disengagement of the precipitation from the first named means; an outlet through which the loosened precipitation may be discharged; and means for ejecting the loosened precipitation from the extractor.

8. In a centrifugal extractor, the combination with means for accumulating precipitation, and other means for breaking up this precipitation, these two means normally travelling in unison; a bottom discharge opening and means for simultaneously causing a relative movement of the said two means for loosening the precipitation and reducing the centrifugal force so that the precipitation will flow from the extractor.

9. A centrifugal extractor comprising members having surfaces for accumulating precipitation, some of the members constituting agitators for loosening up this precipitation, means for normally driving the members having precipitation surfaces and also the agitators in unison, and means for retarding one of the set of members to move it relatively to the other.

10. A centrifugal extractor comprising members having surfaces for accumulating precipitation, other members constituting agitators for loosening up this precipitation, means for connecting and driving both sets of members in unison, and means for disengaging the two sets and retarding one of them.

11. A centrifugal extractor comprising members having surfaces for accumulating precipitation, another set of members constituting agitators for loosening up this precipitation, means for connecting and driving both sets of members in unison, means for disengaging the two and retarding one of them, and a discharge for the loosened precipitation.

12. A centrifugal extractor comprising two members normally rotatable in unison; means with precipitation collecting surfaces attached to one member; precipitation agitators attached to the other member; means for varying the velocity of one member to loosen the precipitation; and means for discharging the precipitation thus loosened.

13. In a centrifugal extractor, a rotatable bowl, a valve in the bottom free from the pressure of centrifugal force, means for driving the valve and bowl, and means for raising the bowl relatively to the valve to discharge the contents of the bowl through the valve.

14. In a centrifugal extractor; a rotatable bowl with a central bottom opening; a valve for the opening; a separable connection between the bowl and valve for rotating them; and means to raise the bowl, severing the connection and opening the valve.

15. In a centrifugal extractor; a rotatable bowl with a central bottom opening; a valve for the opening; a connection between the bowl and valve for rotating them; and means to move the bowl, for severing the connection and for acting as a brake to retard and stop the bowl.

16. In a centrifugal extractor, an upright rotatable bowl with a central bottom opening which lies within the surface line of the contained liquid when it is in motion and through which it will discharge the contents of the bowl when stopped, and means to raise and retard the rotary action of the bowl.

17. In a centrifugal liquid extractor, a bowl rotatable about an upright axis with a top liquid discharge and the bottom opening that is within the upper liquid discharge and the cylindrical surface line of the liquid therein when in motion, means in the bowl for breaking up precipitation, a valve for said opening to discharge the precipitation when the rotary motion of the bowl is stopped and means to raise the bowl for opening the valve.

18. In a centrifugal extractor, a bowl and precipitation collecting members therein which normally rotate in unison and with liquid passages between them, means for varying the velocities of the different members, and means for discharging the contents of the bowl from the bottom, the said members being sufficiently close to cleanse their adjacent faces by their relative movement.

19. In a centrifugal extractor, a bowl having a central bottom outlet, a sediment agitator therein, a valve to close the outlet, and a drive shaft to which the agitator and valve are directly connected.

20. In a centrifugal extractor, a bowl having a bottom outlet, a sediment agitator therein, a valve to close the outlet, a drive shaft to which the agitator and valve are connected, and a separable connection by which the bowl is rotated with the valve.

21. In a centrifugal extractor, a bowl having a bottom outlet, a sediment agitator therein, a valve to close the outlet, a drive shaft to which the agitator and valve are connected, and means for raising the bowl from the valve to open the outlet.

22. In a centrifugal extractor, a receptacle having an inlet and an outlet for normal operation, means for admitting cleaning fluid to the receptacle at the normal outlet, a central valve at the bottom to discharge cleaning fluid when the receptacle is retarded or stopped, and means to raise the receptacle independently in stopping it.

23. In a centrifugal extractor and separator, a rotatable receptacle having an inlet adjacent the axis, and means forming liquid separating overflow ledges at different distances from the axis, the overflow for the lighter liquid being nearer to the axis, a central bottom discharge, and means to raise the bowl to open the discharge.

24. The combination with a rotatable centrifugal extractor bowl, of means for rotating the bowl including a separable drive, and means for raising the bowl to effect the separation.

25. In a centrifugal extractor, a rotatable bowl, a separable driving connection therefor, means to raise the bowl for breaking the driving connection and comprising a brake for stopping the bowl.

26. In a centrifugal extractor, a rotatable bowl, a drive shaft, a separable connection between said bowl and shaft, means attached to the drive shaft for breaking up precipitation in the bowl, and a bottom precipitation discharge outlet for the bowl.

27. In a centrifugal extractor, a rotatable bowl, two sets of alternately intervening precipitation discs in said bowl, means for retarding one set of discs to loosen the precipitation upon both, and means for discharging the precipitation from the bowl.

28. In a centrifugal separator, the combination with means having a precipitation collecting surface, of means for breaking up and ejecting said precipitation, discharge ports for liquids of different specific gravity spaced apart lengthwise of the axis of rotation; the discharge port for the heaviest liquid communicating with the outermost part of the interior of the extractor, and means continuously collecting the separated liquids discharged from the different ports.

29. In a centrifugal extractor; a rotatable bowl and a plurality of normal discharges therefor at different radial distances; a shaft; two sets of adjacent discs that retain impurities on their faces, one set rotatable with the shaft and one with the bowl; a separable connection between the bowl and shaft; means to stop the bowl thereby dislodging impurities from the discs; and a separate discharge for impurities and precipitation at the bottom of the bowl.

30. In a centrifugal extractor and liquid separator, a discharge ledge for a light liquid adjacent the separator axis, means forming a discharge port for heavier liquid, and an adjustable device in this port comprising a hollow threaded tube with side openings for varying the port opening depending upon the relative amount of heavier liquid to be discharged.

31. In a centrifugal extractor, a bowl with an inlet and outlet, a plurality of rotatable corrugated discs engaging each other, the flow from the inlet to outlet of extractor being in parallel streams between the corrugated discs.

32. In a centrifugal extractor, a rotatable bowl, a plurality of discs rotatable with the bowl and leaving a central space and a collecting space at the periphery of the bowl: means for introducing liquid to be cleaned at the center of the bowl, the discs forming a plurality of restricted parallel, and substantial radial streams to assist precipitation, and means to discharge liquids of different specific gravities at different distances from the bowl axis of rotation.

33. In a centrifugal extractor, a plurality of corrugated discs held together and forming restricted radial fluid passages substantially parallel, and means for introducing liquid at the axis and discharging it from the periphery of the discs, the discs collecting precipitation upon their faces.

34. In a centrifugal extractor, a plurality of rotatable corrugated discs held adjacent each other to form substantially parallel radial passages, means for engaging the alternate discs to connect them for separate rotation in two sets, means for directing liquid through said passages, the discs collecting precipitation, and means for retarding and stopping one set of discs to loosen the precipitation from both sets.

35. In a centrifugal extractor, a rotatable receptacle having a discharge outlet which is in position to be entirely out of contact with fluid in the extractor when it is rotated in normal operation, and means for independently retarding the receptacle to discharge the contents from the outlet.

36. In a centrifugal fluid extractor, a rotatable receptacle having a discharge overflow for separated fluid, and an outlet at the bottom of the extractor of less diameter than that of the discharge overflow, and means for independently retarding the receptacle to discharge the contents from the bottom outlet.

37. In a centrifugal extractor, a receptacle having a discharge overflow or outlet for separated fluid while it is rotating, and having another outlet opening for discharging the contents thereof when not rotating, the discharge for non-rotating being at a less distance from the axis of rotation than the outlet during rotation and means for independently stopping the receptacle.

38. In a centrifugal extractor, a receptacle having a top outlet concentric with the axis of rotation for its normal discharge, and a bottom outlet concentric with the axis of rotation but of less diameter than the normal outlet, and means for independently stopping the receptacle to utilize the bottom outlet.

39. In a centrifugal extractor, a bowl for containing a liquid, means for rotating said liquid about a vertical axis, means forming a normal discharge for the liquid during rotation, and depending upon centrifugal force for discharge, and another discharge for the bowl depending upon gravity for operation, and means for independently controlling the bowl to utilize the normal or the gravity discharge.

40. In a centrifugal extractor, a receptacle for containing a liquid, means for rotating said liquid about a vertical axis, the bowl being formed with a normal discharge overflow for liquid while it is being rotated, and depending upon centrifugal force for discharge and with another discharge opening from which the contents of the bowl will be discharged by gravity, and means for independently controlling the bowl to utilize the normal or the gravity discharge.

41. In a centrifugal extractor, a rotatable bowl, agitators for breaking up precipitation which forms therein, normally rotating in unison with the bowl and the precipitation, means for varying the speed either of the bowl or of the agitators to make one pass by the other, dislodging precipitation and means for discharging precipitation thus broken up.

42. In a centrifugal extractor, a vertically rotatable bowl with a normal fluid discharge opening, agitators within said bowl that are normally engaged and travel in unison with the bowl, means for disengaging the agitators and bowl and altering the speed of one of them to dislodge precipitation therein, and a bottom discharge outlet for the bowl of such a size that it will discharge the contents thereof by gravity, but will not permit a discharge of contents from the bowl when it is rotated with normal centrifugal force.

43. A centrifugal extractor comprising two sets of members with surfaces upon which precipitation will deposit, one set of such members constituting agitators that normally travel in unison with the precipitation, means for retarding one of the sets of said members and by such agitation of the confined contents to cause the confined solids and liquid to be mingled, and an outlet for the discharge of said mingled contents.

In testimony whereof I have signed my name to this specification, on this 19th day of December, 1917.

WILLIAM L. MORRIS.